Patented Dec. 12, 1922.                                                          1,438,357

UNITED STATES PATENT OFFICE.

WARREN F. BLEECKER, OF BOULDER, COLORADO, ASSIGNOR TO THE TUNGSTEN PRODUCTS COMPANY, OF BOULDER, COLORADO, A CORPORATION OF COLORADO.

PROCESS FOR THE EXTRACTION OF VANADIUM, URANIUM, AND RADIUM FROM CERTAIN ORES.

No Drawing.    Application filed October 2, 1919.    Serial No. 327,955.

*To all whom it may concern:*

Be it known that I, WARREN F. BLEECKER, a citizen of the United States, residing at Boulder, in the county of Boulder and State of Colorado, have invented certain new and useful Improvements in Processes for the Extraction of Vanadium, Uranium, and Radium from Certain Ores, of which the following is a specification.

My invention relates to a process for the extraction of vanadium, uranium and radium from certain ores and has for its object to provide a convenient, simple and highly effective method of extracting the above mentioned minerals from their ores by solution and subsequent recovery.

The process is particularly adapted for the extraction of values from carnotite ores, but is applicable to other uranium, radium or vanadium carrying ores without material changes in the methods of treatment herein described.

The process best adapted for treating carnotite ores consists in first grinding the ore to a suitable fineness, a size of approximately 20 mesh being well adapted for the purpose.

The finely divided ore is mixed with an alkaline carbonate and sufficient water to form a paste which is heated under pressure. Sodium carbonate is best adapted for this purpose and may be used in quantities up to about 50% of the amount of ore under treatment.

The paste is heated under pressure for its digestion in an autoclave or other similar vessel adapted for the purpose, until part of the vanadium and practically all of the uranium contained in the ore have gone into solution and the barium radium compounds are completely decomposed.

The heat used in this step of the process is preferably generated by the circulation of live steam while the material under treatment is subjected to a pressure of approximately 90 pounds per square inch for the purpose of obtaining the high temperature (about 150 degrees C.) required to generally promote the conductive reactions and to obtain these reactions which do not take place at lower temperatures.

After the process of digestion under the above-described condition has been continued for a period of about one hour, the alkaline liquor carrying the vanadium and uranium in solution together with soluble sulphates resulting from the decomposition of barium sulphate, calcium sulphate or any other sulphate present is separated from the ore by filtration and the residue is washed with water free from sulphates.

The uranium, vanadium and sodium salts may be recovered from the filtrate by evaporation or any other suitable method.

The residue of the filtration containing the barium-radium compounds which have been rendered acid soluble is treated with an acid of about 16 degrees Baumé in a quantity of approximately 25 per cent of the amount of residue under treatment. Hydrochloric acid or any other acid which will not form insoluble radium compounds, may be used for this purpose.

The acid dissolves the radium and is subsequently separated from the residue by filtration after which the radium carried in solution is recovered by precipitation, preferably with the addition of a small amount of sulphuric acid.

The small quantities of vanadium which are present in the acid liquor are also precipitated in the usual manner by the addition of either an alkali or an alkaline earth (lime).

The residue obtained by leaching with the acid liquor may be triturated in order to free the slime or mineral matter which constituted the cementing agent by which the values were carried. Slimes which at this point of the process carry vanadium values only are removed by the usual process of decantation.

In this connection it must be understood that in certain ores the process of grinding and digesting involves sufficient abrasion to free the cementing material to such an extent that the expense of trituration would not be warranted and that in general, trituration may be eliminated from the process if a slightly lower percentage of vanadium extraction is accepted. For these reasons the step of decantation may if so desired follow immediately the act of removing the acid radium-barium liquor.

The acid may be added to the material in either a hot or cold condition and it will be understood that although the use of acid of the above specified specific gravity is preferred, acid of any other strength will effect the solution of the radium, provided that a sufficient quantity is employed to acidify the mixture.

What I claim and desire to secure by Letters-Patent is:

1. The process of extracting values from radium bearing ores consisting in mixing the ore in a finely divided condition with a liquid and about fifty per cent of sodium carbonate, heating the mixture under pressure to a high temperature, separating the alkaline liquor from the residue, treating the residue with an acid, separating the acid liquor by filtration and recovering the radium in solution from the liquor.

2. The process of extracting values from radium bearing ores consisting in mixing the ore in a finely divided condition with an alkaline carbonate and a liquid, heating the mixture under pressure to a temperature of about 150 degrees C., separating the alkaline liquor from the residue, treating the residue with an acid, separating the acid liquor by filtration and recovering the radium in solution from the liquor.

3. The process of extracting values from radium bearing ores consisting in mixing the ore in a finely divided condition with an alkaline carbonate and a liquid, heating the mixture under pressure, to a high temperature, separating the alkaline liquor from the residue, treating the residue with about 25% of hydrochloric acid of about 16 degrees Baumé, separating the acid liquor by filtration and recovering the radium in solution from the liquor.

In testimony whereof I have affixed my signature.

WARREN F. BLEECKER.